United States Patent [19]
McCormick et al.

[11] Patent Number: 5,891,952
[45] Date of Patent: Apr. 6, 1999

[54] AQUEOUS COMPOSITIONS CONTAINING POLYPHENOL COPOLYMERS AND PROCESSES FOR THEIR PREPARATION

[75] Inventors: David R. McCormick, Clawson; Andreas Lindert, Troy; John R. Pierce, Huntington Woods, all of Mich.

[73] Assignee: Henkel Corporation, Gulph Mills, Pa.

[21] Appl. No.: 942,061

[22] Filed: Oct. 1, 1997

[51] Int. Cl.⁶ .................................................. C08L 61/06
[52] U.S. Cl. .......................................... 524/596; 524/594
[58] Field of Search ................................. 524/543, 592, 524/594, 596

[56] References Cited

U.S. PATENT DOCUMENTS

| | | |
|---|---|---|
| 4,376,000 | 3/1983 | Lindert ............................ 148/6.15 R |
| 4,457,790 | 7/1984 | Lindert et al. ..................... 148/6.15 R |
| 4,578,438 | 3/1986 | Demmer ................................. 524/596 |
| 4,963,596 | 10/1990 | Lindert et al. ......................... 526/313 |
| 4,970,264 | 11/1990 | Lindert et al. ....................... 525/328.8 |
| 5,039,770 | 8/1991 | Lindert et al. ......................... 526/312 |
| 5,068,299 | 11/1991 | Lindert et al. ......................... 526/313 |
| 5,116,912 | 5/1992 | Lindert et al. ......................... 525/340 |
| 5,266,410 | 11/1993 | Lindert et al. ......................... 428/461 |
| 5,298,289 | 3/1994 | Lindert et al. ....................... 427/388.4 |

*Primary Examiner*—Paul R. Michl
*Attorney, Agent, or Firm*—Ernest G. Szoke; Wayne C. Jaeschke; Henry E. Millson, Jr.

[57] ABSTRACT

Processes for the preparation of polyphenol polymers useful as surface coatings wherein the process is carried out in the absence of organic solvents, and the polyphenol polymers are the reaction products of a phenolic polymer or copolymer, an amine, and an aldehyde, ketone, or mixture thereof; and the aqueous solutions resulting therefrom.

20 Claims, No Drawings

AQUEOUS COMPOSITIONS CONTAINING POLYPHENOL COPOLYMERS AND PROCESSES FOR THEIR PREPARATION

BACKGROUND OF THE INVENTION

1. Field of the Invention

This invention relates to aqueous solutions of polyphenol polymers useful as surface coatings, and to methods for their preparation.

2. Statement of Related Art

Compositions for the treatment of surfaces with derivatives of polyphenol compounds are known.

However, such phenolic compounds are all prepared in the presence of one or more organic solvents, and the resulting solutions or dispersions are, after optional dilution with water, used without the removal of the organic solvent component.

DESCRIPTION OF THE INVENTION

Other than in the operating examples, or where otherwise indicated, all numbers expressing quantities of ingredients or reaction conditions used herein are to be understood as modified in all instances by the term "about".

It has now been discovered that aqueous solutions of polyphenol polymers can be prepared in the absence of organic solvents, and that the resulting aqueous solutions exhibit surprising improvements over prior organic solvent containing compositions, including aqueous compositions containing organic solvents. These improvements include enhanced cold and warm weather stability, elimination of solvent odor and hazardous flash points, reduced foaming during use, lower reaction temperatures, lower residual amine, easier low molecular weight cation removal, and increased yield of desired reaction products which results in lower residual formaldehyde concentrations and other volatile organic compounds.

The aqueous solutions of the polyphenol polymers produced by the process of the invention are the reaction products of A) at least one phenolic polymer or copolymer;
B) an aldehyde, ketone, or mixture thereof; and
C) at least one amine.

The process of the invention comprises the following steps:

I) reacting the phenolic polymer or copolymer (component A)) in water with an organic or inorganic base to form the corresponding phenoxide salt;

II) reacting the aqueous solution from step I) with the amine, which is preferably a secondary amine (component C) and the aldehyde, ketone, or mixture thereof (component B) at a temperature in the range of from 20° to 100° C., preferably from 50° to 80° C.;

III) adding an acid to neutralize the base and to react with the amine functionality in the product to solubilize the product; and IV) passing the resulting aqueous solution from step III) through an acid cation exchange column (H$^+$ form) to remove base ions, such as sodium ions. If it is desired to also remove unreacted secondary amine as well, a strong acid cation exchange column is used. If it is desired to remove only base ions, a weak acid cation exchange column is used.

The quantities of components A), B) and C) used to prepare the polyphenol polymer product in aqueous solution are generally from about 0.25 to about 2.0 molecular equivalents of component B), and from about 0.25 to about 2.0 molecular equivalents of component C), based on 1 molecular equivalent of component A. The absolute quantities of these components are selected to provide an aqueous solution from step IV) that contains from 5 to 50, preferably from 15 to 35% by weight of solids in the solution. Viscosity considerations will of course determine the upper concentration of any particular product.

In step I) the organic or inorganic base is preferably an alkali metal hydroxide, e.g. sodium or potassium hydroxide, although tetraalkylammonium hydroxides, e.g. tetrabutylammonium hydroxide, or tetraarylammonium hydroxides can also be used. The base should be present in at least 10 mole %, and preferably at least 25 mole %, based on the phenolic polymer or copolymer.

Step I) is preferably carried out at a temperature in the range of from 20° to 50° C., more preferably from 20° to 25° C.

In step III) the acid used to neutralize the base can be organic or inorganic. Useful and preferred acids for this purpose include carbonic acid, acetic acid, citric acid, oxalic acid, ascorbic acid, phenylphosphonic acid, chloromethylphosphonic acid; mono, di and trichloroacetic acid, trifluoroacetic acid, nitric acid, phosphoric acid, hydrofluoric acid, sulfuric acid, boric acid, hydrochloric acid, and the like; these may be employed alone or in combination with each other. The most preferred acid is phosphoric acid.

In step IV), strong acid cation exchange columns are those of the sulfonic acid or phosphonic acid types. Weak acid cation exchange columns are those of the carboxylic acid type.

Component A), i.e. the phenolic polymer or copolymer, is preferably selected from the following polymeric compounds:

a) a polymer material having at least one unit having the formula:

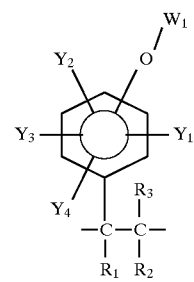

where;

$R_1$ through $R_3$ are independently selected for each of said units from the group consisting of hydrogen, an alkyl group having from 1 to about 5 carbon atoms, or an aryl group having about 6 to about 18 carbon atoms;

$Y_1$ through $Y_4$ are independently selected for each of said units from the group consisting of hydrogen, or an alkyl or aryl group having from 1 to 18 carbon atoms; and $W_1$ is independently selected for each of said units from hydrogen or a hydrolyzable group such as an acyl group, e.g. acetyl, benzoyl, and the like. Hydrogen is preferred.

b) a polymer material having at least one unit having the formula:

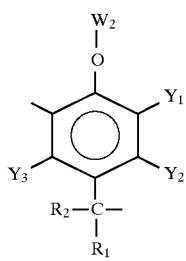

wherein;

$R_1$ through $R_2$ are independently selected for each of said units from the group consisting of hydrogen, an alkyl group having from 1 to about 5 carbon atoms, or an aryl group having from about 6 to about 18 carbon atoms;

$Y_1$ through $Y_3$ are independently selected for each of said units from the group consisting of hydrogen or an alkyl or aryl group having from 1 to 18 carbon atoms; and $W_1$ is independently selected for each of said units from hydrogen or a hydrolyzable group such as an acyl group, e.g. acetyl, benzoyl, and the like. Hydrogen is preferred.

c) a copolymer material wherein at least one portion of said co-polymer has the structure:

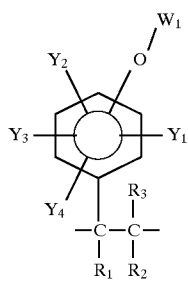

and at least a fraction of said portion is polymerized with one or more monomers having a C=C moiety. Useful monomers include those independently selected for each of said units from the group consisting of acrylonitrile, methacrylonitrile, methyl acrylate, methyl methacrylate, vinyl acetate, vinyl methyl ketone, isopropenyl methyl ketone, acrylic acid, methacrylic acid, acrylamide, methacrylamide, n-amyl methacrylate, styrene, m-bromostryrene, p-bromostyrene, pyridine, diallyldimethylammonium salts, 1,3-butadiene, n-butyl acrylate, tert-butylamino-ethyl methacrylate, n-butyl methacrylate, tert-butyl methacrylate, n-butyl vinyl ether, tert-butyl vinyl ether, m-chlorostyrene, o-chlorostyrene, p-chlorostyrene, n-decyl methacrylate, N,N-diallylmelamine, N,N-di-n-butylacrylamide, di-n-butyl itaconate, di-n-butyl maleate, diethylaminoethyl methacrylate, diethyleneglycol monovinyl ether, diethyl fumarate, diethyl itaconate, diethyl vinylphosphonate, vinylphosphonic acid, diisobutyl maleate, diisopropyl itaconate, diisopropyl maleate, dimethyl fumarate, dimethyl itaconate, dimethyl maleate, di-n-nonyl fumarate, di-n-nonyl maleate, dioctyl fumarate, di-n-octyl itaconate, di-n-propyl itaconate, n-dodecyl vinyl ether, ethyl acid fumarate, ethyl acid maleate, ethyl acrylate, ethyl cinnamate, N-ethylmethacrylamide, ethyl methacrylate, ethyl vinyl ether, 5-ethyl-2-vinylpyridine, 5-ethyl-2-vinylpyridine-1-oxide, glycidyl acrylate, glycidyl methacrylate, n-hexyl methacrylate, 2-hydroxyethyl methacrylate, 2-hydroxypropyl methacrylate, isobutyl methacrylate, isobutyl vinyl ether, isoprene, isopropyl methacrylate, isopropyl vinyl ether, itaconic acid, lauryl methacrylate, methacrylamide, methacrylic acid, methacrylonitrile, N-methylolacrylamide, N-methylolmethacrylamide, N-isobutoxymethylacrylamide, N-isobutoxymethylmethacrylamide, N-alkyloxymethylacrylamide, N-alkyloxymethylmethacrylamide, N-vinyl-caprolactam, methyl acrylate, N-methylmethacrylamide, α-methylstyrene, m-methylstyrene, o-methylstyrene, p-methylstyrene, 2-methyl-5-vinylpyridine, n-propyl methacrylate, sodium p-styrenesulfonate, stearyl methacrylate, styrene, p-styrene-sulfonic acid, p-styrenesulfonamide, vinyl bromide, 9-vinylcarbazole, vinyl chloride, vinylidene chloride, 1-vinylnaphthalene, 2-vinylnaphthalene, 2-vinylpyridine, 4-vinylpyridine, 2-vinylpyridine N-oxide, 4-vinylpyrimidine, N-vinylpyrrolidone; and $W_1$, $Y_1$–$Y_4$ and $R_1$–$R_3$ are as in (a), above.

Within such materials, the ratio of any single monomer to any other monomer can be about 1:99 to about 99:1, preferably about 5:1 to about 1:5, and more preferably 1.5:1 to about 1:1.5.

d) a condensation polymer, i.e. wherein any of polymeric materials a), b) or c) is condensed with a second compound selected from the group consisting of phenols (preferably phenol, alkylphenol, arylphenol, cresol, resorcinol, catechol, pyrogallol), tannins, (both hydrolyzable and condensed) novolak resins, lignin compounds, together with aldehydes, ketones or mixtures thereof, to produce a condensation resin product.

The molecular weight of component A can be in the range of 360 to 30,000 or greater. Preferred component A is poly (4-vinylphenol) having a molecular weight of from 2500 to 10,000, preferably around 5,000.

The term "copolymer" used herein includes polymers, such as terpolymers, made up of two or more monomer components.

Component B) is preferably an aldehyde, and most preferably is formaldehyde, especially in the form of paraformaldehyde. Formaldehyde is generally commercially available in a form that contains a significant quantity of methanol, e.g. 15% methanol. Since the present process is carried out in the absence of organic solvents, formaldehyde free from methanol should be used, such as uninhibited aqueous formaldehyde. Paraformaldehyde is also a convenient form of formaldehyde that does not contain any alcohol component.

Component C) is an amine, preferably a secondary amine, e.g. methylethylamine, dimethylamine, diethylamine, diethanolamine, dipropylamine, di-n-butylamine, diisoamylamine, dibenzylamine, methyldiethylethylenediamine, methylaniline, piperidine, 1,2,3,4-tetrahydroisoquinoline, 6-methoxy-1,2,3,4-tetrahydroisoquinoline, morpholine, piperazine, α-methylaminopropiophenone, α-acetylethylbenzylamine; benzyl-(2-cyclohexanonylmethyl)-amine, 3,4-methylenedioxybenzyl-(2-cyclohexanonylmethyl)-amine, N-methyl-glucamine, glucosamine, and t-butylamine; or mixtures thereof. Primary amines can also be used, such as $C_1$–$C_{12}$ alkyl amines and the like.

An optional further step V) can be employed if it is desired to add a fluorometallic acid to the composition. Step V) is carried out by adding to the composition from step IV) a fluorometallic acid, e.g. fluorotitanic acid ($H_2 Ti F_6$), fluorosilic acid ($H_2 Si F_6$), fluorozirconic acid ($H_2 Zr F_6$), and the like, generally in is from about 0.01 to about 5.0% by weight, based on the weight of the final aqueous composition. The solution can then again be passed through an acid cation exchange column.

Alternatively, instead of step V), the acid used in step III) can be a fluorometallic acid.

The compositions and processes of the present invention are useful in treating a broad range of metal surfaces, including metals having surfaces that have been conversion coated with suitable conversion coatings such as iron phosphate, manganese phosphate, zinc phosphate, and zinc phosphate modified with calcium, nickel, or manganese ions. Examples of suitable metal surfaces include zinc, iron, aluminum and cold-rolled, polished, pickled, and hot-rolled steel and galvanized steel surfaces. As used herein, the term "metal surface" includes both untreated metal surfaces and conversion coated metal surfaces. With regard to aluminum surfaces, the compositions and methods of the present invention can be applied prior to or in place of, any additional corrosion-resistance/paint-based surface treatments.

The compositions and processes of the invention can also be used to treat plastic and "plastic-like" surfaces. Preferred plastic and "plastic-like" surfaces include the surfaces of resins and polymeric materials, including thermoplastic and thermosetting polymers, as well as natural rubbers, mixtures of these materials, and the like.

The aqueous compositions of the invention can be diluted with water to a solids content of from 0.001% to 20% by weight, with a solids content of from 0.001 to 5% by weight being preferred.

The thickness of the dry coating will depend on its purpose or function, but typically ranges from about 0.0001 mil to 25 mils or greater.

The invention will be illustrated but not limited by the following examples.

EXAMPLES

Example 1

To a 500 ml 3-neck round bottom flask equipped with an overhead stirrer, reflux condenser, nitrogen gas inlet, heating mantle and thermocouple, 353.5 g of deionized water, 4.7 grams of sodium hydroxide and 32.3 g of methylethanolamine were added and mixed till dissolved. 53.8 g of poly (4-hydroxystyrene) was then added with mixing. The mixture was then heated to 65° C. with mixing. After 1.5 hours of mixing at 65° C. the polymer was completely dissolved. The solution was then allowed to cool to 30° C. and 13.9 g of 92% paraformaldehyde was added with continued mixing. The solution was mixed for 30 minutes after which the paraformaldehyde was completely dissolved. The solution was then heated with mixing to 65° C. and held for 1.5 hours. After the solution cooled to about 30° C. it was transferred to a 1500 ml beaker equipped with a stirrer, and diluted with 508.4 grams of deionized water. The solution was mixed and 33.4 g of 75% phosphoric acid was added. After adding the phosphoric acid the solution went from clear to very turbid and then cleared up again within one hour. The pH at this stage was 6.7. The solution was then passed through an ion-exchange column containing at least 100 ml of Rohm and Haas IR-120+ cation exchange resin. The final pH was 5.4. The sodium level was less than 1 ppm and the residual formaldehyde was 90 ppm. 3.33 g of 60% fluotitanic acid and 107.8 g of deionized water were then added with mixing.

Example 2

To a 500 ml 3-neck round bottom flask equipped with an overhead stirrer, reflux condenser, nitrogen gas inlet, heating mantle and thermocouple, 353.5 g of deionized water, 4.7 grams of sodium hydroxide and 32.3 g of methylethanolamine were added and mixed till dissolved. 53.8 g of poly (4-hydroxystyrene) was then added with mixing. The mixture was then heated to 65° C. with mixing. After 1.5 hours of mixing at 65° C. the polymer was completely dissolved. The solution was then allowed to cool to 30° C. and 13.9 g of 92% paraformaldehyde was added with continued mixing. The solution was mixed for 30 minutes after which the paraformaldehyde was completely dissolved. The solution was then heated with mixing to 65° C. and held for 1.5 hours. After the solution cooled to about 30° C. it was transferred to a 1500 ml beaker equipped with a stirrer, and diluted with 616.2 grams of deionized water. The solution was mixed and 33.4 g of 75% phosphoric acid was added. After adding the phosphoric acid the solution went from clear to very turbid and then cleared up again within one hour. The pH at this stage was 6.7. The solution was then recirculated through an ion-exchange column containing at least 100 ml of Rohm and Haas IR-120+ cation exchange resin until the pH was less than 6.25. 3.33 g of 60% fluotitanic acid was then added with mixing. The solution was then passed through the same cation exchange column. The final pH was 4.9, the sodium level was <1 ppm and the residual formaldehyde was 81 ppm. No titanium was removed during the deionization step.

Example 3

To a 500 ml 3-neck round bottom flask equipped with an overhead stirrer, reflux condenser, nitrogen gas inlet, heating mantle and thermocouple, 196.71 g of deionized water, 2.98 grams of sodium hydroxide and 59.34 g of N-methyl-D-glucamine were added and mixed till dissolved. 35.76 g of poly(4-hydroxystyrene) was then added with mixing. The mixture was then heated to 65° C. with mixing. After 1.5 hours of mixing at 65° C. the polymer was completely dissolved. The solution was then allowed to cool to 30° C. and 9.73 g of 92% paraformaldehyde was added with continued mixing. The solution was mixed for 30 minutes after which the paraformaldehyde was completely dissolved. The solution was then heated with mixing to 75° C. and held for 10 hours. After the solution cooled to about 30° C. it was transferred to a 1500 ml beaker equipped with a stirrer, and diluted with 678.74 grams of deionized water. The solution was mixed and 16.74 g of 75% phosphoric acid was added with mixing. The pH at this point was 7.3. The solution was then passed through an ion-exchange column containing at least 150 ml of Rohm and Haas IR-120+ cation exchange resin. The final pH was 5.5. The sodium level was less than 1 ppm and the residual formaldehyde was 300 ppm.

Example 4

To a 500 ml 3-neck round bottom flask equipped with an overhead stirrer, reflux condenser, nitrogen gas inlet, heating mantle and thermocouple, 196.71 g of deionized water, 2.98 grams of sodium hydroxide and 59.34 g of N-methyl-D-glucamine were added and mixed till dissolved. 35.76 g of poly(4-hydroxystyrene) was then added with mixing. The mixture was then heated to 65° C. with mixing. After 1.5 hours of mixing at 65° C. the polymer was completely dissolved. The solution was then allowed to cool to 30° C. and 9.73 g of 92% paraformaldehyde was added with continued mixing. The solution was mixed for 30 minutes after which the paraformaldehyde was completely dissolved. The solution was then heated with mixing to 75° C. and held for 10 hours. After the solution cooled to about 30° C. it was transferred to a 1500 ml beaker equipped with a stirrer, and diluted with 587.41 grams of deionized water. The solution was mixed and 108.07 g of 20% fluozirconic acid was added with mixing. The solution was then passed through an ion-exchange column containing at least 150 ml of Rohm and Haas IR-120+ cation exchange resin. The final pH was 3.5. The sodium level was less than 1 ppm and the residual formaldehyde was 300 ppm.

Example 5

To a 500 ml 3-neck round bottom flask equipped with an overhead stirrer, reflux condenser, nitrogen gas inlet, heating mantle and thermocouple, 353.5 g of deionized water, 4.7 grams of sodium hydroxide and 32.3 g of methylethanolamine were added and mixed till dissolved. 53.8 g of poly(4-hydroxystyrene) was then added with mixing. The mixture was then heated to 65° C. with mixing. After 1.5 hours of mixing at 65° C. the polymer was completely dissolved. The solution was then allowed to cool to 30° C. and 13.9 g of 92% paraformaldehyde was added with continued mixing. The solution was mixed for 30 minutes after which the paraformaldehyde was completely dissolved. The solution was then heated with mixing to 65° C. and held for 1.5 hours. After the solution cooled to about 30° C. it was transferred to a 1500 ml beaker equipped with a stirrer, and diluted with 508.4 grams of deionized water. The solution was mixed and 33.4 g of 75% phosphoric acid was added. After adding the phosphoric acid the solution went from clear to very turbid and then cleared up again within one hour. The pH at this stage was 6.7. The solution was then passed through an ion-exchange column containing at least 100 ml of Rohm and Haas IR-120+ cation exchange resin. The final pH was 5.4. The sodium level was less than 1 ppm and the residual formaldehyde was 90 ppm.

Example 6

To a 500 ml 3-neck round bottom flask equipped with an overhead stirrer, reflux condenser, nitrogen gas inlet, heating mantle and thermocouple, 353.5 g of deionized water, 4.7 grams of sodium hydroxide and 23.8 g of methylethanolamine were added and mixed till dissolved. 53.8 g of poly(4-hydroxystyrene) was then added with mixing. The mixture was then heated to 65° C. with mixing. After 1.5 hours of mixing at 65° C. the polymer was completely dissolved. The solution was then allowed to cool to 30° C. and 10.2 g of 92% paraformaldehyde was added with continued mixing. The solution was mixed for 30 minutes after which the paraformaldehyde was completely dissolved. The solution was then heated with mixing to 65° C. and held for 1.5 hours. After the solution cooled to about 30° C. it was transferred to a 1500 ml beaker equipped with a stirrer, and diluted with 512.6 grams of deionized water. The solution was mixed and 41.4 g of 75% phosphoric acid was added. After adding the phosphoric acid the solution went from clear to very turbid and then cleared up again within one hour. The pH at this stage was 4.75. The solution was then passed through an ion-exchange column containing at least 100 ml of Rohm and Haas IR-120+ cation exchange resin. The final pH was 2.25. The sodium level was less than 1 ppm and the residual formaldehyde was <50 ppm.

Example 7

To a 500 ml 3-neck round bottom flask equipped with an overhead stirrer, reflux condenser, nitrogen gas inlet, heating mantle and thermocouple, 196.71 g of deionized water, 2.98 grams of sodium hydroxide and 59.34 g of N-methyl-D-glucamine were added and mixed till dissolved. 35.76 g of poly(4-hydroxystyrene) was then added with mixing. The mixture was then heated to 65° C. After 1.5 hours of mixing at 65° C. the polymer was completely dissolved. The solution was then allowed to cool to 30° C. and 9.73 g of 92% paraformaldehyde was added with continued mixing. The solution was mixed for 30 minutes after which the paraformaldehyde was completely dissolved. The solution was then heated with mixing to 75° C. and held for 10 hours. After the solution cooled to about 30° C. it was transferred to a 1500 ml beaker equipped with a stirrer, and diluted with 675.13 grams of deionized water. The solution was mixed and 20.35 g of 60% fluotitanic acid was added with mixing. The pH at this stage was 6.7. The solution was then passed through an ion-exchange column containing at least 150 ml of Rohm and Haas IR-120+ cation exchange resin. The final pH was 4.65. The sodium level was less than 1 ppm and the residual formaldehyde was 300 ppm.

Example 8

To a 500 ml 3-neck round bottom flask equipped with an overhead stirrer, reflux condenser, nitrogen gas inlet, heating mantle and thermocouple, 196.71 g of deionized water, 2.98 grams of sodium hydroxide and 59.34 g of N-methyl-D-glucamine were added and mixed till dissolved. 35.76 g of poly(4-hydroxystyrene) was then added with mixing. The mixture was then heated to 65° C. with mixing. After 1.5 hours of mixing at 65° C. the polymer was completely dissolved. The solution was then allowed to cool to 30° C. and 9.73 g of 92% paraformaldehyde was added with continued mixing. The solution was mixed for 30 minutes after which the paraformaldehyde was completely dissolved. The solution was then heated with mixing to 75° C. and held for 10 hours. After the solution cooled to about 30° C. it was transferred to a 1500 ml beaker equipped with a stirrer, and diluted with 682.33 grams of deionized water. The solution was mixed and 13.15 g of 70% nitric acid was added with mixing. The pH at this stage was 8.25. The solution was then passed through an ion-exchange column containing at least 150 ml of Rohm and Haas IR-120+ cation exchange resin. The final pH was 6.19. The sodium level was less than 1 ppm and the residual formaldehyde was 300 ppm.

Example 9

To a 500 ml 3-neck round bottom flask equipped with an overhead stirrer, reflux condenser, nitrogen gas inlet, heating mantle and thermocouple, 196.71 g of deionized water, 2.98 grams of sodium hydroxide and 59.34 g of N-methyl-D-glucamine were added and mixed till dissolved. 35.76 g of poly(4-hydroxystyrene) was then added with mixing. The mixture was then heated to 65° C. with mixing. After 1.5 hours of mixing at 65° C. the polymer was completely dissolved. The solution was then allowed to cool to 30° C. and 9.73 g of 92% paraformaldehyde was added with continued mixing. The solution was mixed for 30 minutes after which the paraformaldehyde was completely dissolved. The solution was then heated with mixing to 75° C. and held for 10 hours. After the solution cooled to about 30° C. it was transferred to a 1500 ml beaker equipped with a stirrer, and diluted with 685.45 grams of deionized water. The solution was mixed and 10.03 g of 98% sulfuric acid was added with mixing. The pH at this stage was 7.47. The solution was then passed through an ion-exchange column containing at least 150 ml of Rohm and Haas IR-120+ cation exchange resin. The final pH was 5.43. The sodium level was less than 1 ppm and the residual formaldehyde was 300 ppm.

Example 10

To a 500 ml 3-neck round bottom flask equipped with an overhead stirrer, reflux condenser, nitrogen gas inlet, heating mantle and thermocouple, 320.10 g of deionized water, 4.48 grams of sodium hydroxide and 38.14 g of ethylethanolamine were added and mixed till dissolved. 51.33 g of poly(4-hydroxystyrene) was then added with mixing. The mixture was then heated to 65° C. with mixing. After 1.5 hours of mixing at 65° C. the polymer was completely dissolved. The solution was then allowed to cool to 30° C. and 13.96 g of 92% paraformaldehyde was added with continued mixing. The solution was mixed for 30 minutes after which the paraformaldehyde was completely dissolved. The solution was then heated with mixing to 70° C. and held for 4 hours. After the solution cooled to about 30° C. it was transferred to a 1500 ml beaker equipped with a stirrer, and diluted with 538.45 grams of deionized water. The solution was mixed and 33.54 g of 75% phosphoric acid was added with mixing. The pH at this stage was 6.75. The solution was then passed through an ion-exchange column containing at least 150 ml of Rohm and Haas IR-120+ cation exchange resin. The final pH was 4.5. The sodium level was less than 1 ppm and the residual formaldehyde was 900 ppm.

Comparison Example C1

To a 500 ml 3-neck round bottom flask equipped with an overhead stirrer, reflux condenser, nitrogen gas inlet, heating mantle and thermocouple, 94.59 g of propoxypropanol was added. 53.29 g of poly(4-hydroxystyrene) was then slowly added with mixing. The solution was then heated with mixing to 80° C. and held for 1 hour after which the polymer was completely dissolved. The solution was then cooled to 45° C. and 33.29 g of methylethanolamine was added followed by 106.47 g deionized water with continued mixing. 36.00 g of 37% formaldehyde solution (contained 10% methanol inhibitor) was added slowly over a period of 45 minutes with continued mixing while the temperature was maintained at 45°–50° C. After the formaldehyde addition, the solution was held at 45°–50° C. for two additional hours and then heated to and maintained at 80° C. for three hours. The solution was then cooled to 30° C. and 14.47 g of 75% phosphoric acid was added and mixed well. The solution was then transferred to a 1500 ml beaker equipped with a stirrer. 661.89 g of deionized water was then added with mixing. The resulting solution had a residual formaldehyde level of 800 ppm. The final pH was 7.43.

Comparison Example C2

To a 500 ml 3-neck round bottom flask equipped with an overhead stirrer, reflux condenser, nitrogen gas inlet, heating mantle and thermocouple, 83.33 g of n-propoxypropanol was added. 37.58 g of poly(4-hydroxystyrene) was then slowly added with mixing. The solution was then heated with mixing to 80° C. and held for 1 hour after which the polymer was completely dissolved. The solution was then cooled to 45° C. and a solution of 61.88 g of N-methyl-D-glucamine in 93.75 g deionized water was added with continued mixing. The solution was heated to 57° C. and with continued mixing 25.42 g of 37% formaldehyde (contained 10% methanol inhibitor) was added slowly over a period of 45 minutes. After the formaldehyde addition, the solution was heated to and maintained at 90° C. for nine hours. The solution was then cooled to 30° C. and transferred to a 1500 ml beaker equipped with a stirrer. 693.88 g of deionized water was then added with mixing followed by 4.17 g of 75% phosphoric acid. The resulting solution had a residual formaldehyde level of 650 ppm. The final pH was 8.1.

Example 11

The properties of the composition of Example 3 were compared to the properties of the composition of Comparative Example 2, and the results are set forth in Table 1 below:

TABLE 1

| Property | Example 3 | Comparative Example 2 |
|---|---|---|
| pH | 5.5 | 8.2 |
| % polymer | 8.50 | 8.50 |
| % phosphoric acid | 1.26 | 0.32 |
| Residual $CH_2O$ | 200–300 ppm | 650 ppm |
| Volatile organic compounds | <0.1% wt/wt | 8.58% wt/wt |
| Oxidizable compounds | 177,500 ppm | 410,000 ppm |
| stability @ 49° C. | 30 days | 30 days |
| freezing point | −11° C. | −1° C. |
| cold stability | >−11° C. | >4.5° C. |
| flash point | >93° C. | 61° C. |

Example 12

The properties of the composition of Example 5 were compared to the properties of the composition of Comparative Example 1, and the results are set forth in Table 2 below:

TABLE 2

| Property | Example 5 | Comparative Example 1 |
|---|---|---|
| pH | 5.50 | 7.25 |
| % polymer | 9.2 | 9.2 |
| % phosphoric acid | 2.50 | 1.08 |
| Residual $CH_2O$ | <100 ppm | 800 ppm |
| Volatile organic compounds | <0.1% wt/wt | 9.98% wt/wt |
| Oxidizable compounds | 250.000 ppm | 520.000 ppm |
| stability @ 49° C. | 55 days | 5 days |
| freezing point | −11° C. | −1° C. |
| cold stability | >−11° C. | >4.5° C. |
| flash point | >93° C. | 59° C. |

Example 13

Foaming studies were carried out comparing the foam heights of 1% aqueous solutions of the compositions of Example 3 and Comparison Example 2, and 1% aqueous solutions of the compositions of Example 5 and Comparison Example 1. Each aqueous solution also contained 5 ppm of Parker Amchem Pln 95B defoamer. The solutions were sprayed at 5 psi at 120° F. on identical conversion coated metal surfaces at the rate of 2 sq. ft./liter. The results are given in Tables 3 and 4 below:

TABLE 3

| EXAMPLE | FOAM HEIGHT (cm)[1] | FOAM HEIGHT (cm)[2] |
|---|---|---|
| 3 | 0.1 | 0.2 |
| C2 | 1.0 | 1.5 |

[1]1% aqueous solutions prepared with Detroit tap water
[2]1% aqueous solutions prepared with hard well water

TABLE 4

| EXAMPLE | FOAM HEIGHT (cm)[1] | FOAM HEIGHT (cm)[2] |
|---|---|---|
| 5 | 0.2 | 2.0 |
| C1 | 1.0 | 9.0 |

[1]1% aqueous solutions prepared with Detroit tap water
[2]1% aqueous solutions prepared with hard well water

What is claimed is:

1. A process for the preparation of aqueous solutions of resins comprising a phenolic polymer, formaldehyde, and a secondary amine comprising the steps of:

I) reacting at least one phenolic polymer or copolymer in water with an organic or inorganic base to form the corresponding phenoxide salt;

II) reacting the aqueous solution from step I) with at least one primary or secondary amine and with an aldehyde, ketone, or mixture thereof at a temperature in the range of from about 20° to about 100° C.;

III) adding at least one acid to the reaction mixture from step II) to neutralize any remaining organic or inorganic base and to react with amine functionality in the product to solubilize the product; and IV) passing the resulting aqueous solution from step III) through an acid cation exchange column ($H^+$ form);

wherein the process is carried out in the absence of organic solvents, and the aqueous solution obtained from the process is free from organic solvents and does not contain 0.18% fluorotitanic acid.

2. The process of claim 1 wherein in step I) the phenolic polymer or copolymer is polyvinylphenol.

3. The process of claim 1 wherein in step I) the organic or inorganic base is an alkali metal hydroxide.

4. The process of claim 3 wherein the base is sodium hydroxide.

5. The process of claim 1 wherein step I) is carried out at a temperature in the range of from about 20° to about 50° C.

6. The process of claim 1 wherein in step II) the at least one amine is at least one secondary amine selected from the group consisting of N-methylethanolamine, methylethylamine, dimethylamine, diethylamine, diethanolamine, dipropylamine, di-n-butylamine, diisoamylamine, dibenzylamine, methyldiethylethylenediamine, methylaniline, piperidine, 1,2,3,4-tetrahydroisoquinoline, 6-methoxy-1,2,3,4-tetrahydroisoquinoline, morpholine, piperazine, α-methylaminopropiophenone, α-acetylethylbenzylamine; benzyl-(2-cyclohexanonylmethyl)-amine, 3,4-methylenedioxybenzyl-(2-cyclohexanonylmethyl)-amine, N-methyl-glucamine, glucosamine, and t-butylamine.

7. The process of claim 1 wherein in step II) the aldehyde, ketone or mixture thereof is anhydrous formaldehyde, aqueous formaldehyde, or paraformaldehyde.

8. The process of claim 1 wherein the at least one acid in step III) is selected from the group consisting of carbonic acid, acetic acid, citric acid, oxalic acid ascorbic acid, phenylphosphonic acid, chloromethylphosphonic acid; mono, di and trichloroacetic acid, trifluoroacetic acid, nitric acid, phosphoric acid, hydrofluoric acid, sulfuric acid, boric acid, and hydrochloric acid.

9. The process of claim 8 wherein the at least one acid is phosphoric acid.

10. The process of claim 1 wherein in step IV) the acid cation exchange column is a strong acid cation exchange column.

11. The process of claim 1 wherein in step IV) the acid cation exchange column is a weak acid cation exchange column.

12. The process of claim 1 wherein in step I) the at least one phenolic polymer or copolymer is selected from the group consisting of a) a polymer material having at least one unit having the formula:

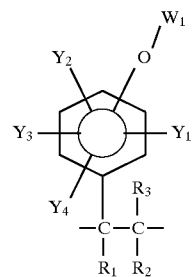

where;
$R_1$ through $R_3$ are independently selected for each of said units from the group consisting of hydrogen, an alkyl group having from 1 to about 5 carbon atoms, and an aryl group having about 6 to about 18 carbon atoms;
$Y_1$ through $Y_4$ are independently selected for each of said units from the group consisting of hydrogen, and an alkyl or aryl group having from 1 to 18 carbon atoms;
$W_1$ is independently selected for each of said units from hydrogen or a hydrolyzable group;

b) a polymer material having at least one unit having the formula:

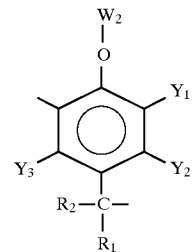

wherein;
$R_1$ through $R_2$ are independently selected for each of said units from the group consisting of hydrogen, an alkyl group having from 1 to about 5 carbon atoms, and an aryl group having from about 6 to about 18 carbon atoms;
$Y_1$ through $Y_3$ are independently selected for each of said units from the group consisting of hydrogen and an alkyl or aryl group having from 1 to 18 carbon atoms.
$W_1$ is independently selected for each of said units from hydrogen or a hydrolyzable group;

c) a copolymer material wherein at least one portion of said co-polymer has the structure:

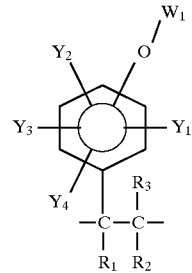

wherein $Y_1$–$Y_4$, $R_1$–$R_3$ and $W_1$ are as defined above and at least a fraction of said portion is polymerized with one or more monomers having a C=C moiety; and d) a condensation polymer wherein any of polymer materials a), b) or c) is condensed with a second compound selected from the group consisting of phenols, tannins, novolak resins, lignin compounds, together with aldehydes, ketones or mixtures thereof, to produce the condensation polymers.

13. The process of claim 1 wherein in step I) the phenolic polymer or copolymer is polyvinylphenol and the base is an alkali metal hydroxide; in step II) the aldehyde, ketone, or mixture thereof is anhydrous formaldehyde or paraformaldehyde; and in step III the at least one acid is phosphoric acid.

14. The process of claim 13 wherein in step IV) the acid cation exchange column is a strong acid cation exchange column.

15. A process for the preparation of aqueous solutions of resins comprising a phenolic polymer, formaldehyde, and a primary or secondary amine comprising the steps of:

I) reacting at least one phenolic polymer or copolymer in water with an organic or inorganic base to form the corresponding phenoxide salt;

II) reacting the aqueous solution from step I) with at least one primary or secondary amine and with an aldehyde, ketone, or mixture thereof at a temperature in the range of from about 20° to about 100° C.;

III) adding at least one acid to the reaction mixture from step II) to neutralize any remaining organic or inorganic base and to react with amine functionality in the product to solubilize the product;

IV) passing the resulting aqueous solution from step III) through an acid cation exchange column ($H^+$ form); and V) adding to the aqueous solution from step IV) a fluorometallic acid;

wherein the process is carried out in the absence of organic solvents and the aqueous solution obtained from the process is free from organic solvents, and wherein instead of step V) the at least one acid in step III) is a fluorometallic acid; except that the process is not carried out with solution i) or solution ii):

| component | parts by weight |
|---|---|
| solution i) | |
| sodium hydroxide | 4.23 |
| N-methylethanolamine | 29.07 |
| polyvinylphenol (ca. 5,000 M.W.) | 48.42 |
| paraformaldehyde (91–93%) | 12.51 |
| 75% phosphoric acid | 30.06 |
| fluorotitanic acid (60%) | 3.00 |
| deionized water | 872.71 |
| solution ii) | |
| sodium hydroxide | 4.20 |
| N-methylethanolamine | 29.10 |
| polyvinylphenol (ca. 5,000 M.W.) | 48.40 |
| paraformaldehyde (91–93%) | 12.50 |
| 75% phosphoric acid | 30.10 |
| fluorotitanic acid (60%) | 3.00 |
| deionized water | 872.70. |

16. The process of claim 15 wherein in step II) the amine is N-methylethanolamine or N-methylglucamine.

17. The process of claim 15 wherein in step I) the phenolic polymer or copolymer is polyvinylphenol and the base is an alkali metal hydroxide; in step II) the aldehyde, ketone, or mixture thereof is anhydrous formaldehyde or paraformaldehyde; in step II) the at least one acid is phosphoric acid; and in step V) the fluorometallic acid is $H_2 Ti F_6$ or $H_2 Zr F_6$.

18. The process of claim 17 wherein in step IV) the acid cation exchange column is a strong acid cation exchange column.

19. The process of claim 17 wherein in step I) the base is sodium hydroxide.

20. The process of claim 15 wherein after step V) the solution is again passed through an acid cation exchange column.

* * * * *